(12) United States Patent
Thomsen et al.

(10) Patent No.: US 8,202,619 B2
(45) Date of Patent: *Jun. 19, 2012

(54) COATED ARTICLE WITH SPUTTER-DEPOSITED TRANSPARENT CONDUCTIVE COATING CAPABLE OF SURVIVING HARSH ENVIRONMENTS, AND METHOD OF MAKING THE SAME

(75) Inventors: Scott V. Thomsen, South Lyon, MI (US); Jingyu Lao, Saline, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/064,775

(22) Filed: Apr. 14, 2011

(65) Prior Publication Data

US 2011/0212312 A1    Sep. 1, 2011

Related U.S. Application Data

(63) Continuation of application No. 12/379,382, filed on Feb. 19, 2009, now Pat. No. 7,947,374.

(51) Int. Cl.
  *B32B 15/00* (2006.01)
(52) U.S. Cl. ......... 428/428; 428/432; 428/434; 428/698
(58) Field of Classification Search .................. 428/432, 428/428, 434, 698
  See application file for complete search history.

(56) References Cited

U.S. PATENT DOCUMENTS

| | | |
|---|---|---|
| 4,601,917 A | 7/1986 | Russo et al. |
| 4,731,256 A | 3/1988 | Russo et al. |
| 4,731,462 A | 3/1988 | Russo et al. |
| 4,743,506 A | 5/1988 | Russo et al. |
| 4,775,552 A | 10/1988 | Russo et al. |
| 4,985,312 A | 1/1991 | Furuya et al. |
| 5,000,790 A | 3/1991 | Gitlitz et al. |
| 5,102,691 A | 4/1992 | Russo et al. |
| 5,229,194 A | 7/1993 | Lingle et al. |
| 5,595,825 A * | 1/1997 | Guiselin ............... 428/428 |
| 5,725,904 A | 3/1998 | Larkin |

(Continued)

FOREIGN PATENT DOCUMENTS

EP    1 293 726    3/2003

(Continued)

OTHER PUBLICATIONS

U.S. Appl. No. 12/379,382, filed Feb. 19, 2009; Thomsen et al.

(Continued)

*Primary Examiner* — Jennifer McNeil
*Assistant Examiner* — Lauren Robinson
(74) *Attorney, Agent, or Firm* — Nixon & Vanderhye P.C.

(57) ABSTRACT

Certain example embodiments relate to sputter-deposited transparent conductive coatings (TCCs) that are capable of surviving the harsh environments of ovens so that they can be included, for example, in oven door applications. In certain example embodiments, zirconium oxide (e.g., $ZrO_2$ or other suitable stoichiometry) may be used as a protective overcoat to protect an underlying Ag layer from corrosion in the atmosphere. In three lite oven door example embodiments, surface 1 has a TCC pyrolytically disposed thereon, surface 2 has a TCC sputter-deposited thereon and, optionally, surface 3 has a TCC sputter-deposited thereon. In two lite oven door example embodiments, surface 1 has a TCC pyrolytically disposed or sputter-deposited thereon, and surface 2 has a TCC sputter-deposited thereon.

8 Claims, 5 Drawing Sheets

U.S. PATENT DOCUMENTS

| | | | |
|---|---|---|---|
| 5,852,284 A | 12/1998 | Teder et al. | |
| 6,024,084 A | 2/2000 | Gerhardinger | |
| 6,144,017 A | 11/2000 | Millett et al. | |
| 6,235,343 B1 | 5/2001 | Joret et al. | |
| 6,268,594 B1 | 7/2001 | Leutner et al. | |
| 6,320,164 B2 | 11/2001 | Millett | |
| 6,472,636 B1 | 10/2002 | Baldwin | |
| 7,246,470 B2 | 7/2007 | Beyrle | |
| 7,947,374 B2 | 5/2011 | Thomsen et al. | |
| 2003/0113550 A1 | 6/2003 | Millett et al. | |
| 2004/0058169 A1 | 3/2004 | Wang et al. | |
| 2004/0197574 A1* | 10/2004 | Stachowiak | 428/432 |
| 2004/0253471 A1 | 12/2004 | Thiel et al. | |
| 2006/0059861 A1 | 3/2006 | Grassmuck et al. | |
| 2007/0029187 A1 | 2/2007 | Krasnov | |
| 2007/0275253 A1* | 11/2007 | Thiel et al. | 428/432 |
| 2008/0138547 A1 | 6/2008 | Maschwitz | |
| 2009/0258239 A1 | 10/2009 | Thiel et al. | |

FOREIGN PATENT DOCUMENTS

| | | |
|---|---|---|
| WO | WO 03/033427 | 4/2003 |
| WO | WO 2010/096108 | 8/2010 |

OTHER PUBLICATIONS

U.S. Appl. No. 12/458,790, filed Jul. 22, 2009; Thomsen et al.

U.S. Appl. No. 12/926,093, filed Oct. 26, 2010; Thomsen et al.

* cited by examiner

COATED ARTICLE WITH SPUTTER-DEPOSITED TRANSPARENT CONDUCTIVE COATING CAPABLE OF SURVIVING HARSH ENVIRONMENTS, AND METHOD OF MAKING THE SAME

This application is a continuation of application Ser. No. 12/379,382, filed Feb. 19, 2009, now U.S. Pat. No. 7,947,374, the entire disclosure of which is hereby incorporated herein by reference in this application.

FIELD OF THE INVENTION

Certain example embodiments of this invention relate to sputter-deposited coatings that are capable of withstanding harsh environments, and/or methods of making the same. More particularly, certain example embodiments of this invention relate to sputter-deposited transparent conductive coatings (TCCs) that are capable of surviving the harsh environments of ovens so that they can be included, for example, in oven door applications. In certain example embodiments, zirconium oxide (e.g., $ZrO_2$ or other suitable stoichiometry) may be used as a protective overcoat to protect an underlying Ag layer from corrosion in the atmosphere.

BACKGROUND AND SUMMARY OF EXAMPLE EMBODIMENTS OF THE INVENTION

The use of transparent conductive coatings (TCCs) in high heat and harsh environments such as, for example, oven door applications is known. See, for example, U.S. Pat. Nos. 6,320,164; 6,235,343; 6,024,084; and 4,985,312, each of which is hereby incorporated herein by reference in its entirety. In general, a plurality of glass substrates inside the oven door helps absorb the heat generated in the interior of the oven during use and also helps reduce transmission of heat to the exterior surface of the oven door. In this regard, the TCC in an oven door helps the door to act as a heat barrier or heat sink. The ability for an oven door to act as a heat barrier or heat sink is needed in connection with self cleaning ovens, as the cook chamber of a self-cleaning oven may reach temperatures as high as 600 degrees C. during the self-cleaning process. The exterior surface of the oven door cannot reach this temperature and remain safe. For example, it is desirable to keep the exterior surface of an oven door below about 77 degrees C., more preferably below about 60 degrees C., and more preferably still lower.

While efficacious for many known layer systems, the use of sputter-coating has been known to result in mechanical durability qualities less than that achieved by known pyrolytic techniques. As a reverse function, however, sputter-coated systems often achieve better infrared reflectance than typical pyrolytic coatings. Also, sputter-coated glasses have generally been recognized as having superior optical and thermal performance characteristics than pyrolytically formed coatings, such as having improved coating uniformity, good emittance, and better solar performance characteristics.

Unfortunately, only combustion vapor deposition (CVD) pyrolytic coatings have been used for commercial oven door applications, since pyrolytic layer systems are durable enough to withstand the harsh environments of an oven including, for example, high temperatures, cleaning cycles, humidity, etc. However, it will be appreciated that if a sputter-coating technique could be devised for a particular coating system wherein the mechanical durability qualities of the sputter-coated system could approach or equal that of a pyrolytic technique, while at the same time achieving the enhanced benefits of sputter-coated technology, a significant step forward in the art would be made.

Thus, it will be appreciated that there is a need in the art for sputter-deposited layer systems that are capable of withstanding harsh environments. It also will be appreciated that there is a need in the art for sputter-deposited transparent conductive coatings (TCCs) that are capable of withstanding the harsh environments of ovens.

In certain example embodiments of this invention, a method of making a door for an oven is provided. An inner glass substrate and an outer glass substrate are provided, with the inner glass substrate being provided for an interior side of the door and the outer glass substrate being provided for an exterior side of the door. A first transparent conductive coating is disposed on a first surface of the inner glass substrate, with the first surface being farthest from the outer glass substrate. A second transparent conductive coating is sputter-deposited on a second surface of the inner glass substrate, with the second surface being closest to the outer glass substrate. The second transparent conductive coating includes a zirconium oxide protective overcoat. The inner and outer glass substrates are thermally tempered.

In certain example embodiments of this invention, an assembly used in the creation of an oven door is provided. An inner glass substrate and an outer glass substrate are provided. A first transparent conductive coating is supported by a first surface of the inner glass substrate, with the first surface being farthest from the outer glass substrate. A second sputter-deposited transparent conductive coating is supported by a second surface of the inner glass substrate, with the second surface being closest to the outer glass substrate. The second transparent conductive coating comprises: a first barrier layer of silicon nitride provided on the second substrate, a first nickel chromium inclusive contact layer provided on the first barrier layer, a silver-inclusive conductive layer provided on the first contact layer, a second nickel chromium inclusive contact layer provided on the conductive layer, and a second barrier layer of silicon nitride provided on the second contact layer, and a zirconium oxide protective overcoat provided on the second contact layer.

According to certain example embodiments, the first transparent conductive coating is disposed on the first surface of the inner glass substrate via sputtering, and the first transparent conductive coating includes a zirconium oxide protective overcoat. According to certain other example embodiments, the first transparent conductive coating is disposed on the first surface of the inner glass substrate via pyrolysis.

According to certain example embodiments, a middle glass substrate is located between the inner glass substrate and the outer glass substrate, and the middle glass substrate is thermally tempered. According to certain example embodiments, a third transparent conductive coating may be sputter-deposited on a third surface of the middle glass substrate, with the third surface being farthest from the outer glass substrate, and with the third transparent conductive coating includes a zirconium oxide protective overcoat.

The sputter-deposited transparent conductive coatings of certain example embodiments may comprise: a first barrier layer of silicon nitride provided on the substrate, a first nickel chromium inclusive contact layer provided on the first barrier layer, a silver-inclusive conductive layer provided on the first contact layer, a second nickel chromium inclusive contact layer provided on the conductive layer, a second barrier layer of silicon nitride provided on the second contact layer, and a protective overcoat comprising zirconium oxide provided on the second barrier layer.

The example embodiments described herein may be used to build an assembly or intermediate product, which may be built into an oven door, and the oven door may be built into an oven.

In certain example embodiments of this invention, a method of making a coated article comprising a coating supported by a substrate is provided. A transparent conductive coating is sputter-deposited on the substrate, with the transparent conductive coating comprising: a first barrier layer of silicon nitride provided on the substrate, a first nickel chromium inclusive contact layer provided on the first barrier layer, a silver-inclusive conductive layer provided on the first contact layer, a second nickel chromium inclusive contact layer provided on the conductive layer, a second barrier layer of silicon nitride provided on the second contact layer, and a protective overcoat comprising zirconium oxide provided on the second barrier layer. One or more of these coated articles may be built into an assembly or intermediate product, which may be built into an oven door, and the oven door may be built into an oven.

In certain example embodiments of this invention, an assembly used in the creation of an oven door is provided. An inner glass substrate and an outer glass substrate are provided. First and second middle glass substrates are provided between the inner and outer glass substrates. First, second, and third sputter-deposited transparent conductive coatings are respectively supported by surfaces of the inner glass substrate, the first middle glass substrate, and the second middle glass substrate that face towards the outer glass substrate. The first, second, and third sputter-deposited transparent conductive coatings each comprise: a first barrier layer of silicon nitride provided on the second substrate, a first nickel chromium inclusive contact layer provided on the first barrier layer, a silver-inclusive conductive layer provided on the first contact layer, a second nickel chromium inclusive contact layer provided on the conductive layer, a second barrier layer of silicon nitride provided on the second contact layer, and a zirconium oxide protective overcoat provided on the second contact layer.

In certain example embodiments of this invention, an assembly used in the creation of an oven door is provided. An inner glass substrate and an outer glass substrate are provided. First and second middle glass substrates are provided between the inner and outer glass substrates. First, second, and third transparent conductive coatings are respectively supported by both surfaces of the inner glass substrate and an outer surface of the first middle glass substrate. The third transparent conductive coating is a sputter-deposited transparent conductive coating. Either (a) the first transparent conductive coating is a sputter-deposited transparent conductive coating and the second transparent conductive coating is a pyrolytically disposed transparent coating, or (b) the second transparent conductive coating is a sputter-deposited transparent conductive coating and the first transparent conductive coating is a pyrolytically disposed transparent coating. Each said sputter-deposited transparent conductive coating comprises: a first barrier layer of silicon nitride provided on the second substrate, a first nickel chromium inclusive contact layer provided on the first barrier layer, a silver-inclusive conductive layer provided on the first contact layer, a second nickel chromium inclusive contact layer provided on the conductive layer, a second barrier layer of silicon nitride provided on the second contact layer, and a zirconium oxide protective overcoat provided on the second contact layer.

The features, aspects, advantages, and example embodiments described herein may be combined to realize yet further embodiments.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments of this invention relate to transparent conductive coatings (TCC) that may be used in oven door applications and/or applications that where a TCC must withstand a great deal of heat and/or other harsh conditions. Certain example embodiments surprisingly and unexpectedly enable sputter-deposited coatings to survive harsh environments, such as those commonly encountered in self-cleaning oven cycles. Surprisingly and unexpectedly, zirconium oxide (ZrOx) may be used as a protective overcoat to protect an underlying Ag layer, e.g., from corrosion in the atmosphere. In other words, the techniques of certain example embodiments help provide a more durable sputter-deposited coating.

The coatings described herein may be used in connection with a variety of different embodiments. For example, the coatings described herein may be used in connection with so-called two lite oven packs, three lite oven packs, etc. In certain example embodiments, the overall product may be heated to a temperature up to about 600 degrees C. As will be described in greater detail below, a pyrolytic coating optionally may be applied to the non-sputter coated side of the glass substrate, and the product may be thermally tempered.

Certain example coated articles may be combined in a window pack with other clear or low-E coated lites, e.g., to manage the thermal characteristics of a window pack to keep the user-side surface temperature below regulatory requirements when the oven is in a self-cleaning cycle. A typical usage model for the window pack design is one that aims to achieve a user side surface temperature below 178 degrees F. when the oven self-cleaning temperature reaches 850 degrees F. Of course, it will be appreciated that the performance demands on the window pack design may vary, for example, based on the actual characteristics of an oven design. Window packs containing uncoated lites, single-sided coated lites and/or double-sided coated lites may be combined to achieve the most cost effective solution for targeted performance characteristics. The coated lites described herein may be used in combination with, or as a substitute to, pyrolytic coatings. The details of certain example configurations are provided below, although it will be appreciated that the same, similar, and/or other configurations also may be present in certain example embodiments.

Figure 1:
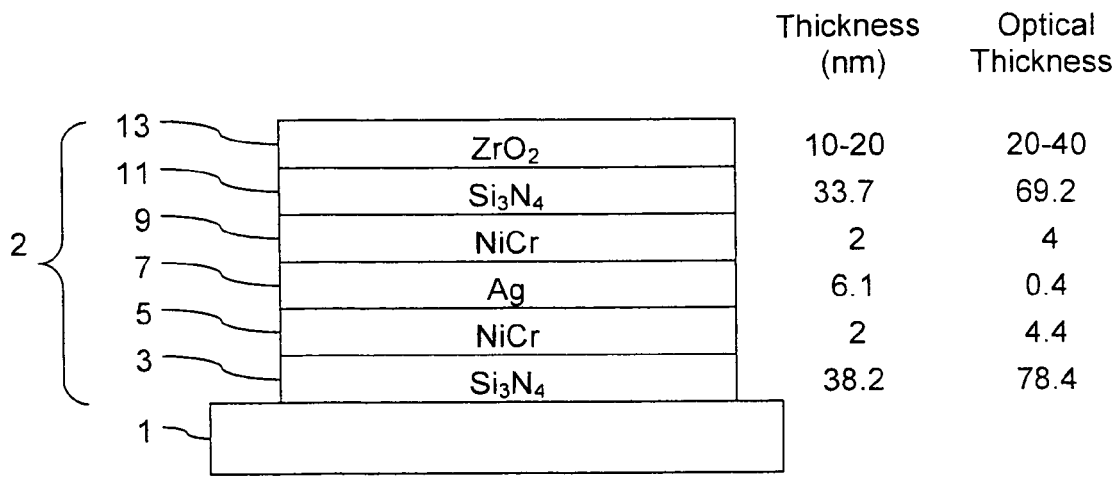
FIG. 1 is a coated article supporting a first sputter-deposited transparent conductive coating capable of surviving harsh environments, in accordance with an example embodiment.
Figure 2:
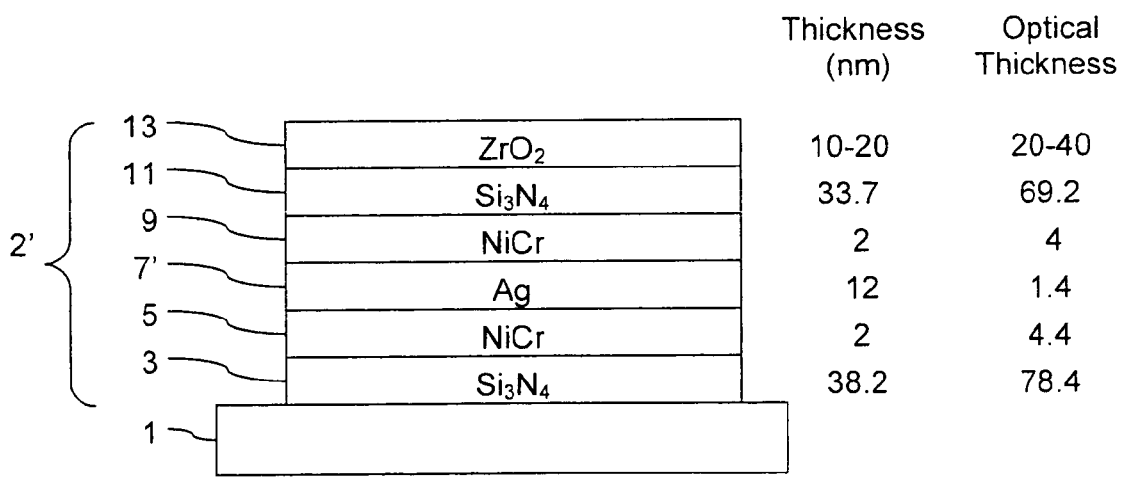
FIG. 2 is a coated article supporting a second sputter-deposited transparent conductive coating capable of surviving harsh environments, in accordance with an example embodiment.

Referring now more particularly to the drawings in which like reference numerals indicate like components throughout the several views, FIGS. 1 and 2 show example coated articles including sputter-deposited TCCs capable of surviving harsh environments, in accordance with example embodiments of this invention. More particularly, FIG. 1 is a coated article 1 supporting a first sputter-deposited transparent conductive coating 2 capable of surviving harsh environments, in accordance with an example embodiment, and FIG. 2 is a coated article 1 supporting a second sputter-deposited transparent conductive coating 2' capable of surviving harsh environments, in accordance with an example embodiment. As explained in greater detail below, in both TCC layer stacks 2 and 2' respectively shown in FIGS. 1 and 2, zirconium oxide (e.g., $ZrO_2$ or other suitable stoichiometry) is applied as a protective overcoat so that a conductive layer (typically Ag) is protected from harsh environmental conditions, with the conductive layer being sandwiched between first and second contact layers and first and second barrier layers, such that the contact layers are provided between the conductive layer and the barrier layers, and such that the zirconium oxide layer is the outermost layer among at least these layers.

FIG. 1 includes a sputter-deposited TCC layer stack 2 supported by a substrate 1. In the layer stack 2 of FIG. 1, a first barrier layer 3, which may include silicon nitride (e.g., $Si_3N_4$ or other suitable stoichiometry), for example, is provided on the substrate 1. A first contact layer 5, which may be a nickel-chromium inclusive layer (e.g., NiCr or oxidized as NiCrOx), for example, is provided on the first barrier layer 3. A conductive layer 7 is provided on the first contact layer 5, with the conductive layer 7 including Ag or any other suitable conductive material. A second contact layer 9 which, as above, may be a nickel-chromium inclusive layer (e.g., NiCr or oxidized NiCrOx), for example, is provided on the conductive layer 7. A second barrier layer 11 which, as above, may include silicon nitride (e.g., $Si_3N_4$ or other suitable stoichiometry), for example, is provided on the second contact layer 9. A protective overcoat 13 of zirconium oxide (e.g., $ZrO_2$ or other suitable stoichiometry) is applied over the second barrier layer 11, so as to protect the conductive layer 7 from the harsh environment. At least the first barrier layer 3 may be provided to a thickness sufficient to reduce the likelihood of migration of sodium from the glass substrate 1 into the conductive layer 7, and at least the second barrier layer 11 may be provided to a thickness sufficient to reduce the likelihood of migration of zirconium from the protective layer 13 into the conductive layer 7.

FIG. 2 is a coated article 1 supporting a second sputter-deposited transparent conductive coating 2' capable of surviving high heats, in accordance with an example embodiment. FIG. 2 is similar to FIG. 1, with the exception that the TCC 2' of FIG. 2 includes a conductive layer 7' that is different from the conductive layer 7 of the TCC 2 in FIG. 1. The conductive layer 7' is thicker than the conductive layer 7, thus making the overall TCC 2' more conductive than the TCC 2 of FIG. 1.

As can be seen, the thickness of the conductive layer 7' in FIG. 2 is about double that of the conductive layer 7 in FIG. 1. These differences in thickness result in changes in conductivity of the overall coatings 2' and 2 and, thus, corresponding differences in sheet resistance. In particular, the FIG. 1 example results in a sheet resistance of about 15 ohms/square, whereas the FIG. 2 example results in a sheet resistance of 8 ohms/square. It will be appreciated that the amount of conductive material can be increased or decreased so as to affect the overall sheet resistance. For example, the inventors of the instant application have determined that the amount of Ag can be increased in certain example embodiments so as to reduce the sheet resistance to about 4 ohms/square without significantly jeopardizing the Ag (e.g., as a result of coming into contact with the harsh environment of an oven), provided that the overall layer system is provided on the second surface of the lite pack (as shown, for example, in connection with FIG. 4 below). In general, a sheet resistance of about 12-15 ohms/square can be obtained using the FIG. 1 example, or slight variations of the thickness in Ag thereof.

Example physical thicknesses (in nm) of the layers in the sputter-deposited TCC 2 and 2' are provided in the table below:

| Layer | FIG. 1 Example (nm) | FIG. 2 Example (nm) | Preferred Range (nm) | More Preferred Range (nm) |
|---|---|---|---|---|
| $ZrO_2$ | 10-20 | 10-20 | 1.5-50 | 10-20 |
| Top $Si_3N_4$ | 33.7 | 33.7 | 10-100 | 25-60 |
| Top NiCr | 2 | 2 | 1-10 | 1-5 |
| Ag | 6.1 | 12 | 2-20 | 3-12 |
| Bottom NiCr | 2 | 2 | 1-10 | 1-5 |
| Bottom $Si_3N_4$ | 38.2 | 38.2 | 10-150 | 20-80 |

Figure 3:
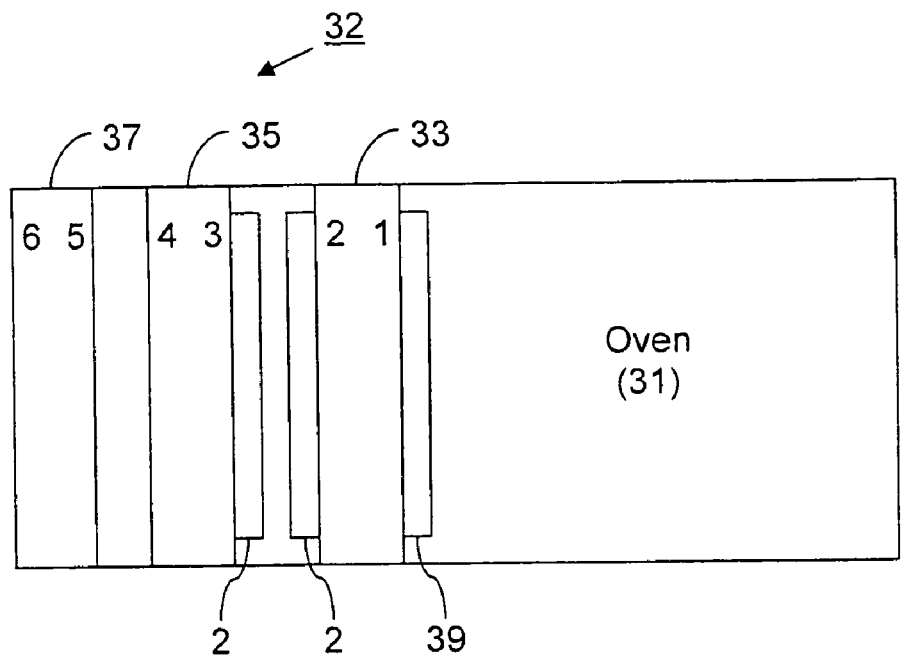
FIG. 3 is an example oven and oven door incorporating at least the first sputter-deposited transparent conductive coating of FIG. 1, in accordance with an example embodiment.
Figure 4:
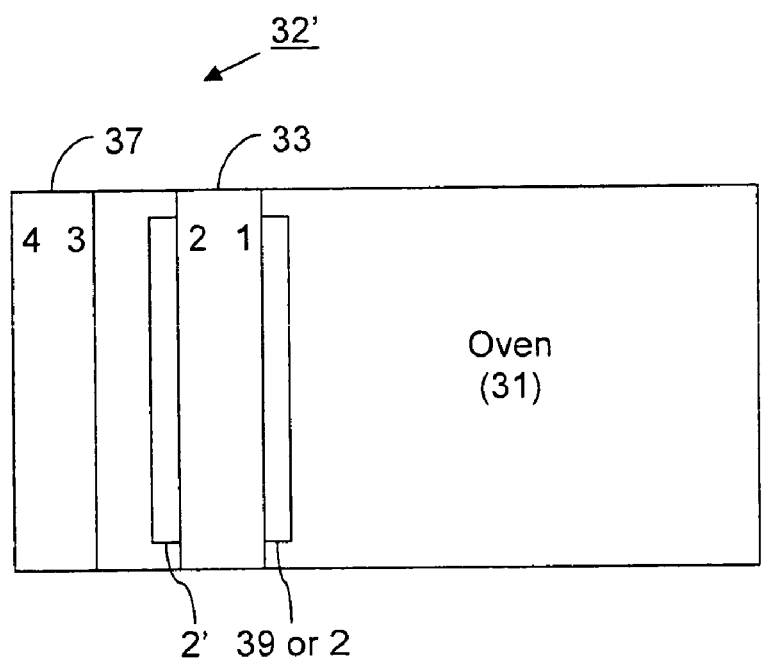
FIG. 4 is an example oven and oven door incorporating at least the second sputter-deposited transparent conductive coating of FIG. 2, in accordance with an example embodiment.

FIGS. 3 and 4 show example ovens and oven doors according to example embodiments of this invention. More particularly, FIG. 3 is an example oven 31 and oven door 32 incorporating at least the first sputter-deposited transparent conductive coating 2 of FIG. 1, in accordance with an example embodiment. The oven door 32 of FIG. 3 is a so-called three lite oven pack, in that it includes an innermost glass substrate 33, a middle glass substrate 35, and an outermost glass substrate 37. In certain example embodiments, the outermost glass substrate 37 may be a decorative lite. In certain example embodiments, the lites may have a common thickness (e.g., a thickness of 3.2 mm), although the lites need have the same thickness in all embodiments.

In the FIG. 3 example embodiment, a TCC 39 is applied to surface 1 of the lite pack 32 via a pyrolytic technique such as flame pyrolysis. The transparent conductive coating 2 of FIG. 1 is applied to surface 2 of the lite pack 32 via sputtering. Optionally, in certain example embodiments, the TCC 2 of FIG. 1 also may be sputter-deposited onto surface 3 of the lite pack 32 in addition to being sputter-deposited onto surface 2 thereof. Also optionally, in certain example embodiments, the TCC 2 of FIG. 1 also may be sputter-deposited onto surface 4 of the lite pack 32.

The innermost glass substrate 33, middle glass substrate 35, and outermost glass substrate 37 surprisingly and unexpectedly may be heat treated, even though sputter-deposited coatings are applied at least to the innermost glass substrate 33 and optionally the middle glass substrate 35. For example, the innermost glass substrate 33, middle glass substrate 35, and outermost glass substrate 37 may be thermally tempered, e.g., at a temperature of at least about 580 degrees C., more preferably at least about 600 degrees C. As noted above, conventional sputter-deposited coatings cannot withstand this level of heat. Thus, the ability to thermally temper and to include such sputter-deposited coatings in a product to be used in connection with an oven (where the temperatures are high and where at least the self-cleaning conditions are particularly harsh) is an advantage that is superior to conventional techniques that prohibit the use of sputter-deposited coatings in such applications.

FIG. 4 is an example oven 31 and oven door 32' incorporating at least the second sputter-deposited transparent conductive coating 2' of FIG. 2, in accordance with an example embodiment. FIG. 4 is a so-called two lite oven pack and, thus, only includes an innermost glass substrate 33 and an outermost glass substrate 37. As above, in certain example embodiments, the outermost glass substrate 37 may be a decorative lite and, in certain example embodiments, the lites may have a common thickness (e.g., a thickness of 3.2 mm), although the lites need have the same thickness in all embodiments.

Because there are only two lites in the lite pack 32', additional conductivity may be desirable for some or all of the TCCs disposed on the substrates 33 and 37 thereof. Thus, in certain example embodiments, the TCC 2' of FIG. 2 is sputter deposited on surface 2 of the lite pack 32'. In general, TCCs similar to that of TCC 2' of FIG. 2 may be used in connection with the two lite pack 32' of FIG. 4, so that the sheet resistance of the coating applied to surface 2 thereof is between about 4-8 ohms/square.

In contrast to the lower sheet resistance of the TCC 2' sputter-deposited on surface 2 of the lite pack 32', the surface 1 of the lite pack 32' may have either (1) a pyrolytically disposed TCC 39 applied thereto, or (2) the higher sheet resistance TCC 2 of FIG. 1 sputter-deposited thereon. As above, the ability to thermally temper and to include such sputter-deposited coatings in a product to be used in connection with an oven (where the temperatures are high and where at least the self-cleaning conditions are harsh) is an advantage that is superior to conventional techniques that prohibit the use of sputter-deposited coatings. The pyrolytically disposed TCC 39 may have a sheet resistance in certain example embodiments of about 12-15 ohms/square.

Figure 5A:
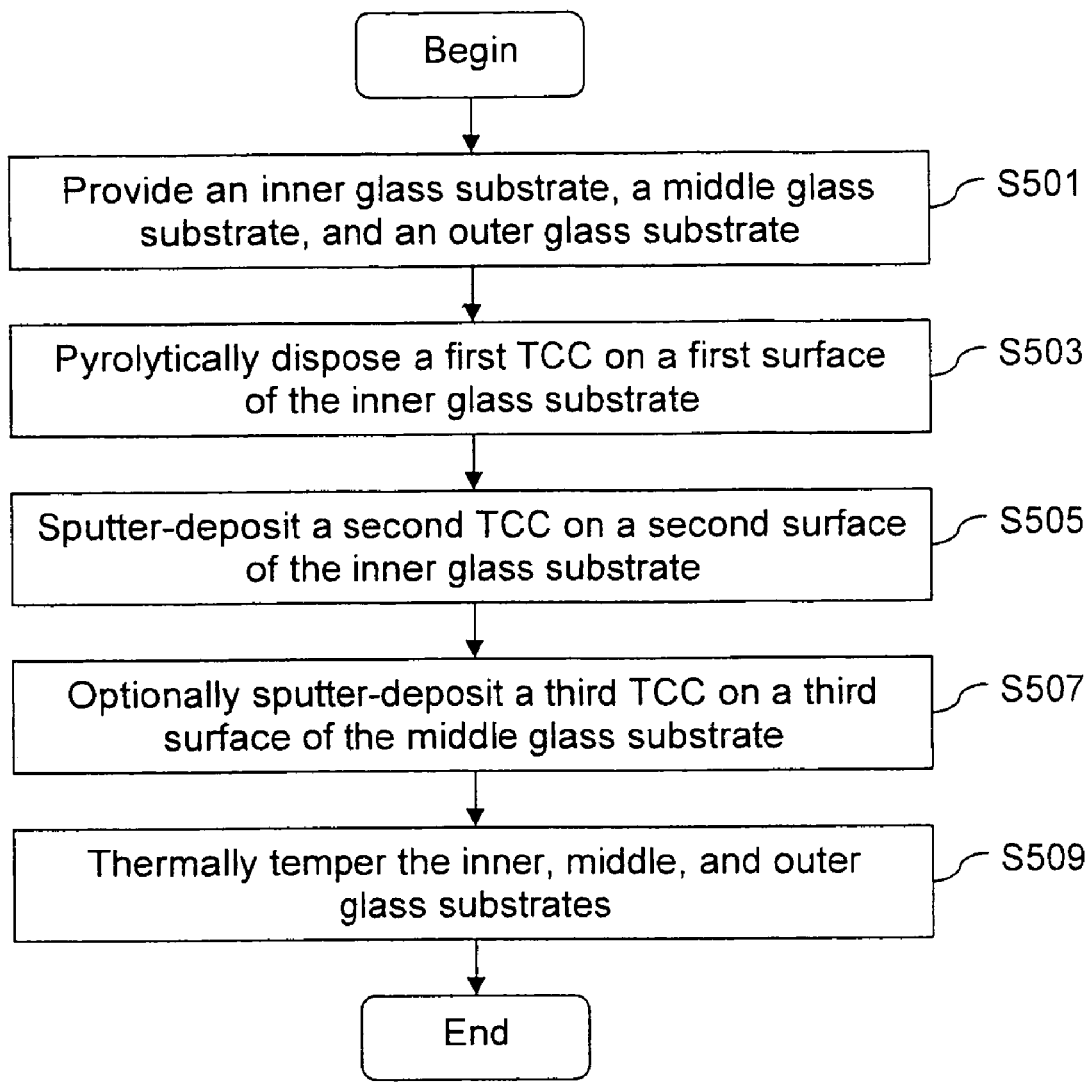
FIG. 5a is a flowchart showing an example process for creating the oven door of FIG. 3, in accordance with an example embodiment.

FIG. 5a is a flowchart showing an example process for creating the oven door of FIG. 3, in accordance with an example embodiment. Inner, middle, and outer glass substrates are provided in step S501. A first TCC is pyrolytically disposed (e.g., via CVD or the like) on a first surface of the inner glass substrate in step S503. In step S505, a second TCC is sputter-deposited on a second surface of the inner glass substrate. In step S507, which is optional, a third TCC may be sputter-deposited on a third surface of the middle glass substrate. The inner, middle, and outer glass substrates are thermally tempered in step S509. In one or more step(s) not shown, at least the inner, middle, and outer glass substrates may be built into an assembly in making the oven door and, furthermore, the oven door may be connected to an oven.

Figure 5B:
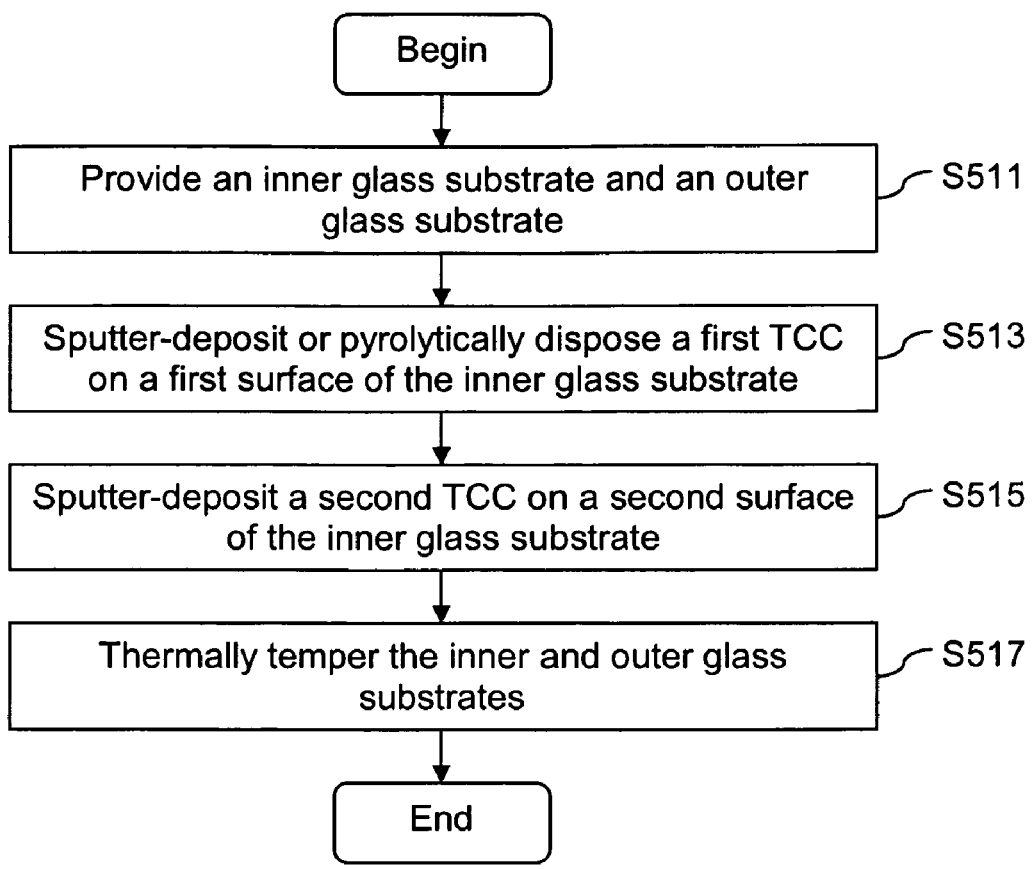
FIG. 5b is a flowchart showing an example process for creating the oven door of FIG. 4, in accordance with an example embodiment.

FIG. 5b is a flowchart showing an example process for creating the oven door of FIG. 4, in accordance with an example embodiment. In step S511, inner and outer glass substrates are provided. In step S513, a first TCC is either sputter-deposited or pyrolytically disposed on a first surface of the inner glass substrate. A second TCC is sputter-deposited on a second surface of the inner glass substrate in step S515. The inner and outer glass substrates are thermally tempered in step S517. In one or more step(s) not shown, at least the inner and outer glass substrates may be built into an assembly in making the oven door and, furthermore, the oven door may be connected to an oven.

In the example methods described in FIGS. 5a and 5b, the sputter-deposited TCCs may comprise, in order, a first barrier layer of silicon nitride provided closest to the respective substrate, a first nickel chromium inclusive contact layer provided on the first barrier layer, a silver-inclusive conductive layer provided on the first contact layer, a second nickel chromium inclusive contact layer provided on the conductive layer, and a second barrier layer of silicon nitride provided on the second contact layer, with a protective overcoat (e.g., of or including zirconium oxide) being provided on the second contact layer. It will be appreciated that more or fewer layers may be provided in certain example embodiments and, thus, the various layers described herein may directly or indirectly contact one another, depending on the particular implementation. In general, a TCC layer provided on a surface of a substrate closest to the oven may have a higher sheet resistance, typically in the range of about 12-15 ohms/square, regardless of whether the TCC layer is sputter-deposited or pyrolytically disposed. The remaining TCC layers may have sheet resistances of either 12-15 ohms/square or 4-8 ohms/square, for example, depending on the particular implementation chosen. As noted above, the amount of conductive material in the layer stacks can be increased or decreased to reach the desired level of conductivity/sheet resistance.

The pyrolytically deposited coatings of certain example embodiments may comprise tin oxide. The pyrolytically deposited tin oxide coatings may be doped with a dopant, for example, of fluorine. Example fluorine-doped tin oxide coatings are described, for example, in U.S. Pat. Nos. 4,601,917; 4,731,256; 4,731,462; 4,743,506; 4,775,552; 5,000,790; 5,102,691; 5,725,904, the contents of each of which is hereby incorporated herein by reference in its entirety. Additionally, a pyrolytically coated article commercially available from EGP and marketed under the tradename HBI (Heat Barrier I) or HBII (Heat Barrier II) coating may be used in connection with certain example embodiments, as may a pyrolytically coated article commercially available from Pilkington marketed under the tradename TEC 15.

Figure 6A:
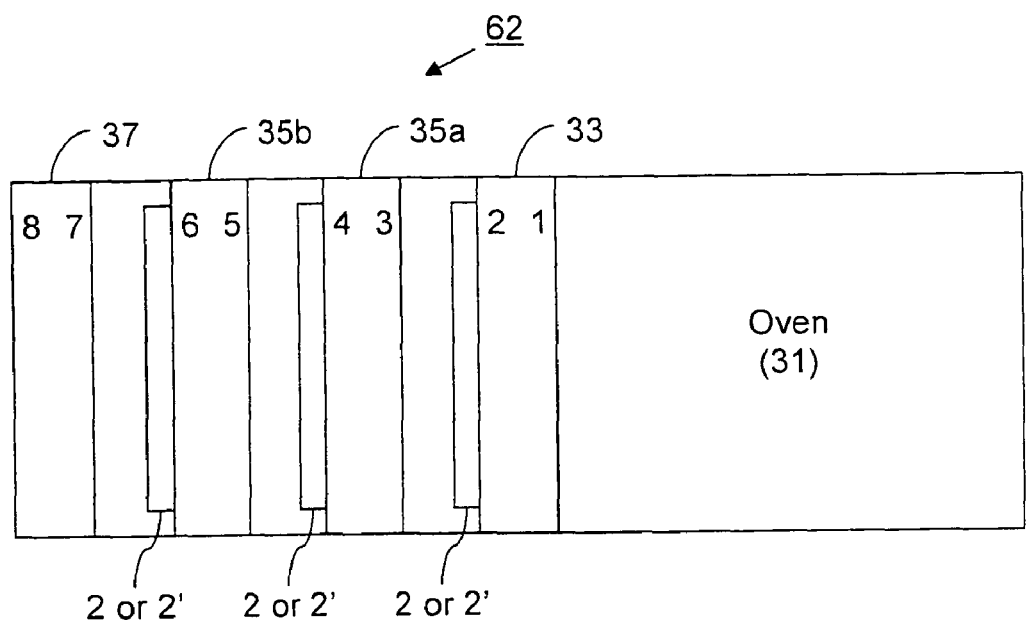
FIGS. 6a and 6b are example ovens and oven doors incorporating four substrates and sputter-deposited transparent conductive coatings, in accordance with example embodiments.
Figure 6B:
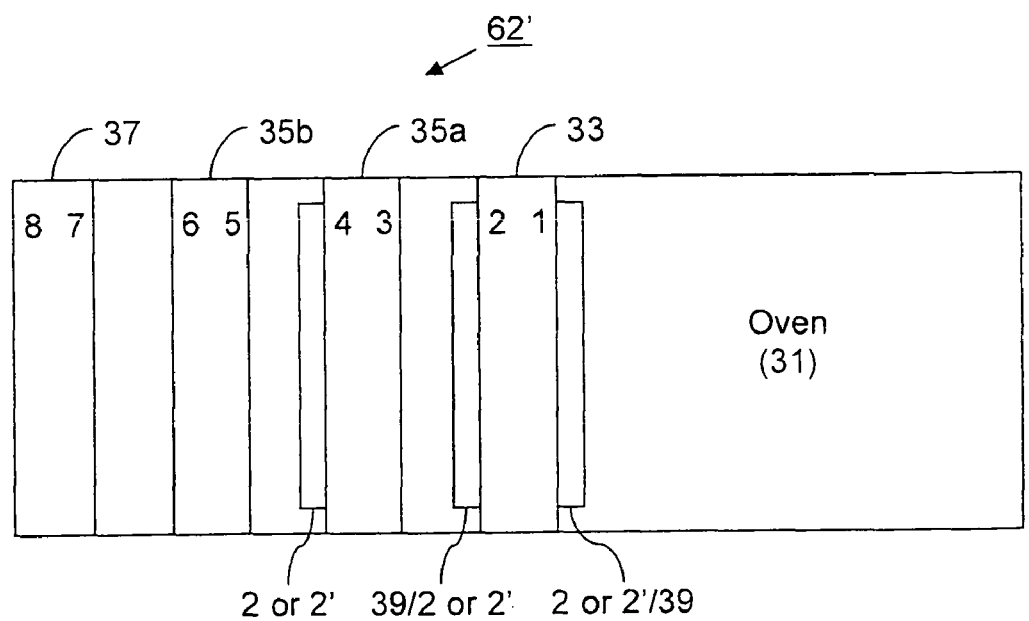

Certain example embodiments have been described as relating to two- or three-lite oven packs. However, more lites may be used in connection with certain example embodiments, wherein such lites may be coated or uncoated. For example, FIGS. 6a and 6b show example four lite oven packs. Both FIGS. 6a and 6b include innermost glass substrates 33, first and second middle glass substrates 35a and 35b, and outermost glass substrates 37 in their respective lite packs 62 and 62'. In FIG. 6a, the surfaces facing away from the oven on the innermost glass substrates 33 and the first and second middle glass substrates 35a and 35b (surfaces 2, 4, and 6) are coated with TCC layer stacks 2 or 2'.

By contrast, in FIG. 6b, one surface of the innermost substrate 33 has TCC layer stacks 2 or 2' applied thereto, whereas the other surface of the innermost substrate 33 has pyrolytically disposed TCC 39 applied thereto. Thus, in certain example embodiments, when surface 1 has TCC layer stacks 2 or 2' applied thereto, surface 2 has pyrolytically disposed TCC 39 applied thereto, and vice versa. The surface of the first middle substrate 35a that faces away from the oven (surface 4) has TCC layer stacks 2 or 2' applied thereto. Of course, it will be appreciated that other coating configurations may be used in connection with certain example embodiments.

Advantageously, the sputter-deposited TCC coatings of certain example embodiments may lead to better color uniformity and/or emissivity characteristics, at least as compared to current products that involve pyrolytic coatings only. Thus, the example embodiments described herein may be used in new applications and/or areas where a higher performance and/or aesthetic appeal is necessary. Furthermore, the lower emissivity characteristics of certain example embodiments also may be used to improve window pack performance and ultimately reduce OEM costs, e.g., by reducing the number of lites required for the oven design.

Although certain example embodiments have been described in connection with low and/or high conductivity TCC layers, multiple TCC layers may have the same conductivity and/or sheet resistance. More over, the TCC layers may have sheet resistances of anywhere between about 4-15 ohms/square. High conductivity layers may have sheet resistances at the lower end of this range (e.g., from about 4-8 ohms/square as described above), whereas low conductivity layers may have sheet resistances at the upper end of the range (e.g., from about 12-15 ohms/square as described above). Of course, the low and high conductivity TCC layers are not limited to these exact ranges. Moreover, TCC layers according to example embodiments may fall within the example ranges above, regardless of whether separate "high" and "low" conductivity layers or multiple layers with the same or similar conductivities are implemented. Thus, for example, the layer stacks 2 in FIG. 3 may be replaced with layer stacks 2' or other similar layer stacks with the same, similar, or different conductivities and sheet resistances. Similar modifications also are possible to the FIG. 4 and FIGS. 6a and 6b example embodiments.

In certain example embodiments, the window packs may not be sealed. In such embodiments, the coatings may be designed so as to have a suitably high durability to survive any harsh environments they encounter. The inclusion of a zirconium oxide overcoat may help ensure such durability in certain example embodiments. In certain example embodiments, vertical and/or horizontal coating methods may be used to apply at least the pyrolytic coatings to the substrates.

Although certain example embodiments have been described as relating to oven door applications, it will be appreciated that the example techniques described herein may be applied to other applications. For example, the example techniques described herein may be applied to other applications where it is desirable to have a durable sputter-deposited coating capable of surviving high temperatures and/or other harsh conditions. Furthermore, the techniques of certain example embodiments may be applied to other electronics and/or appliance applications.

While a particular layer or coating may be said to be "on" or "supported by" a surface or another coating (directly or indirectly), other layer(s) and/or coatings may be provided therebetween. Thus, for example, a coating may be considered "on" and "supported by" a surface even if other layer(s) are provided between layer(s) and the substrate. Moreover, certain layers or coatings may be removed in certain embodiments, while others may be added in other embodiments of this invention without departing from the overall spirit of certain embodiments of this invention. Thus, by way of example, an encapsulating coating applied in liquid sol-gel form in accordance with an example embodiment may be said to be "on" or "supported by" a sputtering target material, even though other coatings and/or layers may be provided between the sol-gel formed coating and the target material.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly used in the creation of an oven door, comprising:
   an inner glass substrate and an outer glass substrate of an oven door, wherein the inner glass substrate is the innermost glass substrate in the oven door;
   a first transparent conductive coating supported by a first major surface of the inner glass substrate, the first surface being farthest from the outer glass substrate; and
   a second sputter-deposited transparent conductive coating supported by a second major surface of the inner glass substrate, the second surface being closest to the outer glass substrate,
   wherein the second transparent conductive coating of the oven door comprises:
   a first barrier layer comprising silicon nitride provided on the second surface of the inner glass substrate,
   a first nickel chromium inclusive contact layer provided on the first barrier layer,
   a silver-inclusive conductive layer provided on the first contact layer,
   a second nickel chromium inclusive contact layer provided on the conductive layer,
   a second barrier layer comprising silicon nitride provided on the second contact layer, and
   a protective overcoat including zirconium oxide provided on the second contact layer.

2. The assembly of claim 1, wherein the first transparent conductive coating is disposed on the first surface of the inner glass substrate via pyrolysis.

3. The assembly of claim 2, further comprising: a middle glass substrate located between the inner glass substrate and the outer glass substrate.

4. The assembly of claim 3, further comprising a third sputter-deposited transparent conductive coating on a third surface of the middle glass substrate, the third surface being farthest from the outer glass substrate,
   wherein the third transparent conductive coating comprises:
   a first barrier layer comprising silicon nitride provided on the third surface of the middle glass substrate,
   a first nickel chromium inclusive contact layer provided on the first barrier layer,
   a silver-inclusive conductive layer provided on the first contact layer,
   a second nickel chromium inclusive contact layer provided on the conductive layer,
   a second barrier layer comprising silicon nitride provided on the second contact layer, and
   a protective overcoat including zirconium oxide provided on the second contact layer.

5. The assembly of claim 4, wherein each of the second and third transparent conductive coatings has a sheet resistance of 12-15 ohms/square.

6. The assembly of claim 2, wherein the second transparent conductive coating has a sheet resistance of 4-8 ohms/square.

7. The assembly of claim 1, wherein the first transparent conductive coating is a sputter-deposited coating comprising:
   a first barrier layer comprising silicon nitride provided on the first surface,
   a first nickel chromium inclusive contact layer provided on the first barrier layer,
   a silver-inclusive conductive layer provided on the first contact layer, a second nickel chromium inclusive contact layer provided on the conductive layer, a second barrier layer comprising silicon nitride provided on the second contact layer, and a protective overcoat including zirconium oxide provided on the second contact layer.

8. The assembly of claim 7, wherein the first transparent conductive coating has a sheet resistance of 12-15 ohms/square, and wherein the second transparent conductive coating has a sheet resistance of 4-8 ohms/square.

* * * * *